(12) United States Patent
Lopez De Arroyabe

(10) Patent No.: US 9,806,649 B2
(45) Date of Patent: Oct. 31, 2017

(54) SAFETY CIRCUIT ARRANGEMENT FOR AN ELECTRICAL DRIVE UNIT

(71) Applicant: Bayerische Motoren Werke Aktiengesellschaft, Munich, DE (US)

(72) Inventor: Jose Lopez De Arroyabe, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 15/094,473

(22) Filed: Apr. 8, 2016

(65) Prior Publication Data

US 2016/0226410 A1    Aug. 4, 2016

Related U.S. Application Data

(63) Continuation of application No. PCT/EP2014/074448, filed on Nov. 13, 2014.

(30) Foreign Application Priority Data

Dec. 19, 2013  (DE) .................. 10 2013 226 763

(51) Int. Cl.
*H02H 7/08* (2006.01)
*H02P 6/14* (2016.01)
(Continued)

(52) U.S. Cl.
CPC .................. *H02P 6/14* (2013.01); *B60L 3/00* (2013.01); *B60L 3/0046* (2013.01);
(Continued)

(58) Field of Classification Search
USPC ...... 318/400.21, 139, 130, 563, 400.22, 782
See application file for complete search history.

(56) References Cited

U.S. PATENT DOCUMENTS

2008/0198899 A1    8/2008  Igarashi
2010/0214055 A1*   8/2010  Fuji ........................ B60L 3/00
                                                    340/3.1
(Continued)

FOREIGN PATENT DOCUMENTS

CN    101246059 A    8/2008
CN    103444070 A    12/2013
(Continued)

OTHER PUBLICATIONS

"Heissleiter (NTC—Widerstaende),"(Jan. 2010), XP055173597, URL: http://www.controllersandpcs.de/legrarchiv/pdfs/elektronik/pass01_03x.pdf.
(Continued)

*Primary Examiner* — Jorge L Carrasquillo
(74) *Attorney, Agent, or Firm* — Crowell & Moring LLP

(57) ABSTRACT

A safety circuit arrangement is provided for an electrical drive unit, wherein the electrical drive unit includes a traction battery, an intermediate circuit capacitance connected in parallel to the traction battery, and an electric machine which can be supplied with electrical power by the traction battery. The electric machine has a plurality of phases which can be connected to the traction battery via a controllable inverter having a plurality of switch elements. The safety circuit arrangement includes: a discharge circuit which is designed to take a predeterminable discharge current from the intermediate circuit capacitance in the activated operational state of the discharge circuit, a short-circuit control circuit which is designed to short-circuit at least some of the phases of the electric machine by controlling some of the switch elements in the activated operational state of the short-circuit control circuit, a supply voltage circuit which is designed to provide a supply voltage on the basis of input voltage delivered to the supply voltage circuit, an intermediate circuit voltage applied to the intermediate
(Continued)

circuit capacitor being delivered as input voltage, and an activating element which is designed to close an activation path when a switch-on condition is present in order to activate the discharge circuit and the short-circuit control circuit by providing the supply voltage.

18 Claims, 3 Drawing Sheets

(51) Int. Cl.
　　　*B60L 3/00*　　　(2006.01)
　　　*B60L 7/00*　　　(2006.01)
　　　*H02P 3/22*　　　(2006.01)

(52) U.S. Cl.
　　　CPC ........... *B60L 3/0061* (2013.01); *B60L 3/0092* (2013.01); *B60L 7/003* (2013.01); *H02P 3/22* (2013.01)

(56) References Cited

U.S. PATENT DOCUMENTS

| | | | | |
|---|---|---|---|---|
| 2011/0241581 A1* | 10/2011 | Flock | ......................... | B60L 3/04 318/400.3 |
| 2014/0015316 A1* | 1/2014 | Schoenknecht | ........... | B60L 3/04 307/10.1 |
| 2014/0125293 A1* | 5/2014 | Kainuma | .................. | H02J 7/00 320/166 |

FOREIGN PATENT DOCUMENTS

| | | |
|---|---|---|
| DE | 10 2011 006 512 A1 | 10/2012 |
| DE | 10 2012 100 951 A1 | 8/2013 |
| DE | 10 2012 101 508 A1 | 8/2013 |
| DE | EP 2639916 A2 * | 9/2013 .............. B60L 3/003 |
| EP | 2 433 830 A1 | 3/2012 |

OTHER PUBLICATIONS

Widerstandsthermometer. In: Wikipedia, die freie Enzyklopaedie. URL: http://de.wikipedia.org/w/index.php?title=Widerstandsthermometer&oldid=124914199.

International Search Report (PCT/ISA/210) issued in PCT Application No. PCT/EP2014/074448 dated Mar. 27, 2015 with English-language translation (four (4) pages).

German-language Written Opinion (PCT/ISA/237) issued in PCT Application No. PCT/EP2014/074448 dated Mar. 27, 2015 (seven (7) pages).

German Search Report issued in counterpart German Application No. 10 2013 226 763.0 dated Sep. 4, 2014 with partial English-language translation (thirteen (13) pages).

U. Tietze et al., Halbleiter-Schaltungstechnik; Springer Verlag Berlin, 11. neuberarb. Auflage (1999) pp. 960-961, ISBN 3-540-64192-0 (three (3) pages).

Chinese Office Action issued in counterpart Chinese Application No. 201480057127.5 dated Jan. 13, 2017 with English translation (17 pages).

Gan et al., "Collection of Practical Electronic Circuits", Publishing House of Electronics Industry, Mar. 1987, six pages.

\* cited by examiner

SAFETY CIRCUIT ARRANGEMENT FOR AN ELECTRICAL DRIVE UNIT

CROSS REFERENCE TO RELATED APPLICATIONS

This application is a continuation of PCT International Application No. PCT/EP2014/074448, filed Nov. 13, 2014, which claims priority under 35 U.S.C. §119 from German Patent Application No. 10 2013 226 763.0, filed Dec. 19, 2013, the entire disclosures of which are herein expressly incorporated by reference.

BACKGROUND AND SUMMARY OF THE INVENTION

The invention relates to a safety circuit arrangement for an electric drive unit, wherein the electric drive unit has a traction battery, an intermediate circuit capacitor connected in parallel with the traction battery, and an electric machine that can be supplied with electric power by the traction battery. The electric machine has a plurality of phases that can be connected to the traction battery via a controllable inverter having a plurality of switch elements.

Electric drive units designed in this manner can be used in a wide variety of ways. Among others, they can be used as a drive unit in a vehicle, wherein the vehicle may be in the form of a hybrid vehicle or in the form of an electric vehicle. In the case of a hybrid vehicle, not only the electric machine but also a further unit is used for the drive, normally an internal combustion engine, whereas an electric vehicle is driven exclusively by an electric machine. The electric machines used are normally designed as internal rotor machines, in which a rotatably mounted rotor is surrounded by a fixed stator. The stator produces a rotating magnetic field that takes along the rotor. The rotor has a rotor shaft that is operatively connected to a drive shaft of the vehicle. The electric machines used may be synchronous machines, particularly hybrid synchronous machines, which are preferably embodied as permanently excited synchronous machines. A hybrid synchronous machine is a permanently excited synchronous machine that additionally has a strongly pronounced reluctance effect, caused by a correspondingly chosen rotor geometry, that is jointly used for producing the torque acting on the rotor. A traction battery is a high-voltage storage, which can have a voltage level that may be in the order of magnitude of fully 250 to 450 volts. Preferably, a traction battery is constructed from Li ion battery cells.

To ensure safety links with an electric drive unit, particularly when the electric drive unit is arranged in a vehicle and the electric machine is in the form of a permanently excited synchronous machine, various safety measures need to be provided.

Firstly, care must be taken to ensure that the high voltage applied to the intermediate circuit capacitance can be reduced by discharging the intermediate circuit capacitance when particular conditions are present or arise, such as particular operating states of the vehicle. This safety measure is intended to ensure that, for example in the idle state of the vehicle, the intermediate circuit capacitance is not live and hence, for example when maintenance work is performed, there is no possibility of contact with the high voltage, which is potentially hazardous to human beings. A vehicle contains a safety circuit arrangement that is designed specifically for performing this safety measure.

Secondly, safety measures also need to be provided for the electric machine, particularly when it is a permanently excited electric machine. In the case of permanently excited electric machines, their design means that, during operation, the relative movement that occurs between the stator windings and the permanent magnets prompts a negative field voltage to be induced in the stator windings, which is referred to as the rotor voltage. As rotation speed increases, the rotor voltage rises until, during operation of the electric machine, it is in the region of the supply voltage provided by the traction battery for the electric machine. If there is now no voltage source connected to the intermediate circuit capacitance and hence to the intermediate circuit, i.e. the connection between the traction battery and the intermediate circuit capacitance or intermediate circuit is interrupted for any reason, then the rotor voltage can be present across the intermediate circuit capacitance. This can lead to damage to the intermediate circuit capacitance and/or components of the inverter, particularly to the switch elements. In order to avoid such damage, when particular conditions are present or arise, such as particular operating states, provision is made, specifically when the traction battery is not connected to the intermediate circuit capacitance, in particular, for the phases of a permanently excited electric machine to be shorted by appropriate actuation of the switch elements of the inverter. Also, for the purpose of performing this safety measure, a safety circuit arrangement designed specifically for this purpose is provided in a vehicle.

Both for the purpose of discharging the intermediate circuit capacitance and for the purpose of shorting the phases of the electric machine, particularly a permanently excited electric machine, the safety circuit arrangements designed for this purpose need to be actuated or to have an appropriate supply voltage applied to them. Particularly as far as this aspect is concerned, the known safety circuit arrangements are not yet optimum. Thus, in particular operating states of the vehicle, for example in the case of an accident in which, owing to external effects on the vehicle, it is no longer possible for the safety circuit arrangements to be supplied with electric power either by the traction battery or via the starter battery, a sufficient or temporarily continuous supply to the safety circuit arrangements is not guaranteed, which is why firstly discharge of the intermediate circuit capacitance to a level at which a voltage that is nonhazardous to human beings is established on the intermediate circuit capacitance and secondly persistent shorting of the phases of the permanently excited electric machine is not guaranteed.

Furthermore, the known safety circuit arrangements have a need for improvement also in respect of the number of components that are needed for implementing the respective safety measure, and as a consequence thereof in respect of the installation space needed for the design of the safety circuit arrangement, and also in respect of the heat generation that arises for the safety circuit arrangements.

It is therefore an object of the present invention to provide an improved safety circuit arrangement that, even when electric power can be supplied neither via the traction battery nor via the starter battery, allows both discharge of the intermediate circuit capacitance to a level at which a voltage that is nonhazardous to human beings is established and persistent shorting of the phases of an electric machine, particularly a permanently excited electric machine. In addition, the safety circuit arrangement is intended to be improved or optimized in respect of the number of electrical or electronic components required, in respect of the installation space required and in respect of the heat generation that arises during the operation thereof. That is to say that the safety circuit arrangement is intended to be constructed from as few components as possible, to require a very small installation space and additionally to have very low heat generation during operation. In addition, the production costs of the safety circuit arrangement are intended to be low.

This and other objects are achieved by a safety circuit arrangement of the type cited at the outset that has the following features: a discharging circuit that is designed, in its activated operating state, to take a prescribable discharge current from the intermediate circuit capacitance, a short circuit control circuit that is designed, in its activated operating state, to short at least some of the phases of the electric machine by actuating some of the switch elements, a supply voltage circuit that is designed to provide supply voltage on the basis of an input voltage that is supplied to it, wherein the input voltage supplied is an intermediate circuit voltage that is applied to the intermediate circuit capacitance, and an activation element that is designed to close an activation path when a switch-on condition is present, in order to activate the discharging circuit and the short circuit control circuit by providing the supply voltage.

The safety circuit arrangement according to the invention is based on a plurality of concepts. According to a first concept, the safety circuit arrangement of the invention has provision for a supply circuit arrangement to which, as an input voltage, the intermediate circuit voltage that is present across the intermediate circuit capacitance is supplied in order to be able to provide a supply voltage on the basis of this intermediate circuit voltage. Hence, a supply of electric power to the safety circuit arrangement is guaranteed even when supply is possible neither by the traction battery nor by the starter battery (voltage level 12 volts, for example), for example when the supply lines are interrupted. Hence, even if the traction battery and the starter battery fail simultaneously, it is possible both for the intermediate circuit capacitance to be discharged to a level at which a voltage that is nonhazardous to human beings is established and for the phases of a permanently excited electric machine to be persistently shorted.

According to a second concept, the safety circuit arrangement contains both a discharging circuit and a short circuit control circuit. Hence, synergies that arise can be used, which, by way of example, leads to a reduction in the components that are needed for implementing the discharging functionality, on the one hand, and for implementing the shorting functionality, on the other hand. Equally, the integration of both functionalities into a circuit arrangement reduces the installation space that is needed for the design of the circuit arrangement, i.e. the size of the board or printed circuit board that is needed for accommodating the circuit arrangement decreases. The printed circuit board and hence the safety circuit arrangement can be produced much more compactly. The reduction in the number of components, these being high-voltage resistors, power transistors and diodes, inter alia, additionally has the positive side effect that the heat generation on the board carrying the circuit arrangement and hence the introduction of heat into the board are lower. Furthermore, the smaller number of components and the lower installation space requirement mean an overall reduction in production costs.

According to a third concept, in combination with the safety circuit arrangement according to the invention, i.e. simultaneously, it is possible firstly for the phases of an electric machine to be shorted and secondly for an intermediate circuit capacitance and hence the intermediate circuit to be discharged. It is therefore possible to achieve an extremely high degree of safety for an electric drive unit with little complexity and with a high level of reliability. It is therefore simultaneously possible to discharge a DC voltage intermediate circuit and short all the terminals of an electric polyphase machine. This is achieved particularly by virtue of the activation element operatively connecting the supply voltage circuit, on the one hand, and the discharging circuit and also the short circuit control circuit, on the other hand, to one another via an activation path.

Before further advantageous embodiments of the safety circuit arrangement according to the invention are discussed, it should be mentioned at this juncture that the above reference to a permanently excited electric machine is not meant to have any restricting effect. It goes without saying that the safety circuit arrangement according to the invention can also be used for electric machines of a different design.

Advantageously, the discharging circuit is in a controllable form, so that the discharge current taken from the intermediate circuit capacitance can be established.

Preferably, the short circuit control circuit is designed, in its activated operating state, to short all the phases of the electric machine as a result of actuation of the switch elements. This measure achieves an extremely high degree of safety.

As already explained, the electric drive unit is preferably arranged in a vehicle. Accordingly, the switch-on condition advantageously exists when at least one of the following situations is present:
  transfer of the vehicle from a driving operating state to an idle state,
  shutdown of the traction battery, or
  presence of a critical driving operating state that is different than the normal driving operating state.

When the vehicle is transferred from a driving operating state, in which the vehicle is driven by the electric machine, to an idle state, in which the vehicle is stationary, and in which particularly the electric machine is no longer connected to the traction battery and hence to the intermediate circuit capacitance, care must be taken to ensure that the intermediate circuit capacitance is discharged. At the beginning of the idle state, the voltage that is present across the intermediate circuit capacitance corresponds to the high voltage provided by the traction battery. Accordingly, the onset of the idle state requires the intermediate circuit capacitance to be discharged, as far as possible very quickly, to a level at which a voltage that is nonhazardous to human beings is established. This is achieved with the safety circuit arrangement according to the invention. Alternatively, the switch-on condition can exist when the presence of a shutdown state is identified.

When shutdown of the traction battery is detected, care must be taken to ensure that firstly the intermediate circuit capacitance is discharged in order to reduce the voltage that is present across it, which corresponds to the high voltage provided by the traction battery directly at the beginning of shutdown of the traction battery, and that secondly the phases of the electric machine are shorted, so that no voltages can build up thereon. This is also achieved with the safety circuit arrangement according to the invention. Alternatively or additionally, a traction battery state condition can be sensed and evaluated, which provides evidence of the state of charge of the traction battery and/or of a fault that is present in the traction battery, for example.

If it is detected that a critical driving operating state that is different than the normal driving operating state is present, then safety measures likewise need to be taken. By way of example, a critical driving operating state may be a driving operating state in which very large accelerations, particularly lateral accelerations but also longitudinal accelerations, and/or high yaw angle speeds arise, all of which are an indication of a skidding process, as may exist in the case of an accident, for example, or in the case of a journey in which a driver demand means that the physically dependent limit values, for example in relation to static friction, particularly in relation to cornering, are exceeded. In this case, it is likewise advisable firstly to discharge the intermediate circuit capacitance as quickly as possible and secondly to short the phases of the electric machine. The aforementioned variables can advantageously each be sensed by use of suitable sensors.

Alternatively and/or additionally, a machine state condition can be sensed and evaluated.

In one preferred embodiment of the invention, the supply voltage circuit is a series circuit consisting of an electrical supply resistor and a zener diode. This is a simple, reliable and inexpensive measure to provide the supply voltage that is required for operating the safety circuit arrangement. The complexity or the requirement for implementing a supply voltage circuit is/are therefore reduced to a minimum degree. At the same time, the circuit constructed in this manner allows passive discharge of the intermediate circuit capacitance even when the discharging circuit is not activated.

In a further preferred embodiment of the invention, the discharging circuit is a series circuit consisting of an electrical load resistor and a controllable semiconductor element. This measure is also distinguished by its simple and inexpensive design, given simultaneously high reliability. At the same time, the discharge current can be established in a simple manner. Preferably, the semiconductor element is a bipolar transistor.

In a further preferred embodiment of the invention, the safety circuit arrangement additionally has a monitoring circuit. This monitoring circuit is designed to process an electrical signal that represents a temperature that is present on the load resistor. Hence, if a profile of the temperature of the load resistor is unfavorable, this temperature essentially being determined by the discharge current flowing through the load resistor, it is possible for temperature-influencing measures to be taken, particularly when the temperature approaches or has even already exceeded a prescribed limit value; in particular, it is possible for measures to be taken that result in the temperature no longer rising further, but preferably being lowered. Consequently, the monitoring circuit is designed to actuate the controllable semiconductor element on the basis of an ascertained monitoring result. As a result, it is possible to set, preferably to reduce, the value of the discharge current taken from the intermediate circuit capacitance. In the extreme case, the semiconductor element can be actuated such that a discharge line through which the discharge current flows is interrupted or opened, and hence no further discharge current flows, i.e. the discharge current assumes the value zero. The load resistor is the main load for the actively occasioned discharge of the intermediate circuit capacitance.

In one preferred embodiment of the aforementioned measure, the monitoring circuit contains a measuring bridge circuit constructed from electrical measuring resistors, wherein one of the measuring resistors is in the form of a temperature-dependent resistor. This is a particularly simply implemented measure for sensing the temperature that is present on the load resistor, that is additionally very reliable and simultaneously allows precise temperature sensing. Consequently, the temperature-dependent resistor is arranged physically close to the load resistor, so that the electrical signal to be processed by the monitoring circuit represents the temperature that is present on the load resistor as precisely as possible.

In one advantageous embodiment of the aforementioned measure, the temperature-dependent resistor has a negative temperature coefficient. Using a measuring resistor in such a form, it is a simple matter to implement reliable and precise sensing of the temperature that is present on the load resistor.

In one preferred embodiment of the invention, the safety circuit arrangement additionally has a stabilization circuit that has its circuitry arranged between the supply voltage circuit and the activation element. This measure ensures that a sufficiently large current can be provided for the actuation of the switch elements of the inverter that is required for shorting the phases of the electric machine. This ensures reliable shorting of the phases of the electric machine.

Advantageously, the inverter has a multiplicity of half-bridges, wherein each half-bridge has a first and a second switch element. The first switch element is connected to a supply terminal of the traction battery and the second switch element is connected to a ground terminal of the traction battery. In the safety circuit arrangement according to the invention, the short circuit control circuit is preferably designed to actuate the second switch elements connected to the ground terminal. This is a measure that allows actuation of the switch elements for shorting the phases of the electric machine without great circuit complexity. Alternatively, however, it is likewise contemplated for the short circuit control circuit to be embodied such that the switch elements connected to the supply terminal of the traction battery are actuated for the purpose of shorting phases of the electric machine.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
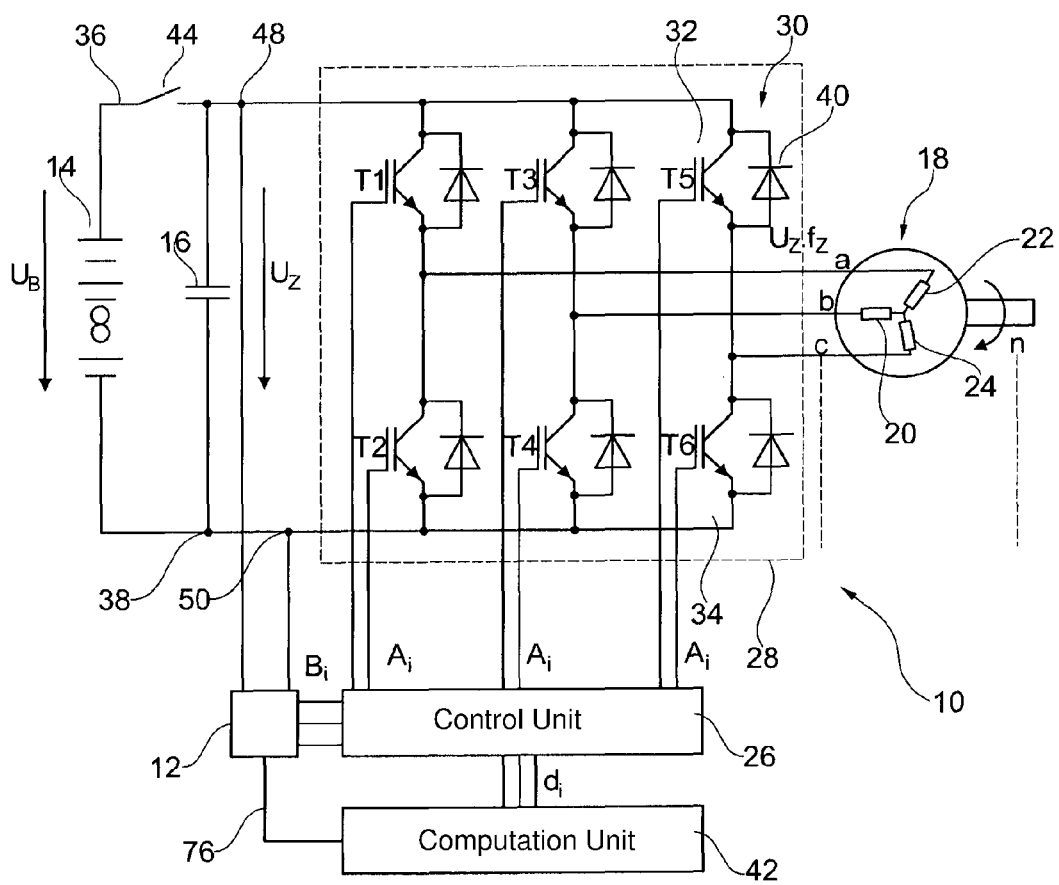
FIG. 1 is a circuit diagram showing the connection of a safety circuit according to an embodiment of the invention to an electric drive unit.

FIG. 1 shows an electric drive unit 10 and a safety circuit arrangement 12 provided therefor. The electric drive unit 10 has a traction battery 14 that can provide a high voltage $U_B$. Connected in parallel with the traction battery 14 is an intermediate circuit capacitance 16. The traction battery 14 supplies an electric machine 18 with electric power. The electric machine 18 has a plurality of phases 20, 22, 24 that can be connected to the traction battery 14 via an inverter 28 that can be actuated by an control unit 26. The inverter 28 has a plurality of switch elements T1, T2, T3, T4, T5, T6 that are arranged to form half-bridges, one of which is denoted by the reference numeral 30 by way of example. Each of these half-bridges 30 has a first switch element 32 and a second switch element 34 in each case, the first switch element 32 being connected to a supply terminal 36 of the traction battery 14 and the second switch element 34 being connected to a ground terminal 38 of the traction battery 14. In FIG. 1, just one first and one second switch element are denoted by the reference numerals 32 and 34, respectively. Each of the switch elements T1, T2, T3, T4, T5, T6 has a freewheeling diode connected in parallel with it, one of which is denoted by the reference numeral 40 by way of example. In FIG. 1, the switch elements are embodied as IGBTs. This is not intended to have any restricting effect. It goes without saying that other semiconductor components can also be used, for example MOSFETs.

FIG. 1 additionally shows a computation unit 42. The computation unit 42 is used to ascertain duty cycle values $d_i$ on the basis of a torque setpoint value that represents the torque needed to be produced by the electric machine 18, said duty cycle values being supplied to the control unit 26 and being converted into control signals $A_i$ for the switch elements T1, T2, T3, T4, T5, T6 in the control unit 26.

Now, the safety circuit arrangement 12 is incorporated such that the actuation signals $B_i$ produced thereby, which are used to actuate the switch elements T1, T2, T3, T4, T5, T6 to short the phases 20, 22, 24, are likewise supplied to the control unit 26. In order to short the phases 20, 22, 24, the switch elements T1, T2, T3, T4, T5, T6 are actuated by means of the actuation signals $B_i$ such that the switch elements T1, T3, T5 are off and the switch elements T2, T4, T6 are on. In this case, the control unit 26 is in the form such that the actuation signals $B_i$ are overlaid on the actuation signals $A_i$. By way of example, this can be effected such that the actuation signals $B_i$ are output with priority before the actuation signals $A_i$. An exemplary embodiment of a circuit arrangement that can be used to overlay the actuation signals $A_i$ and $B_i$ is described in connection with FIG. 3.

In FIG. 1, an interruption 44 indicates that the traction battery 14 can be (actively) isolated, e.g. when the vehicle is stopped by the driver, or can (passively) fail, for example as a result of a supply line being interrupted, which can occur in the event of an accident, for example.

Figure 2:
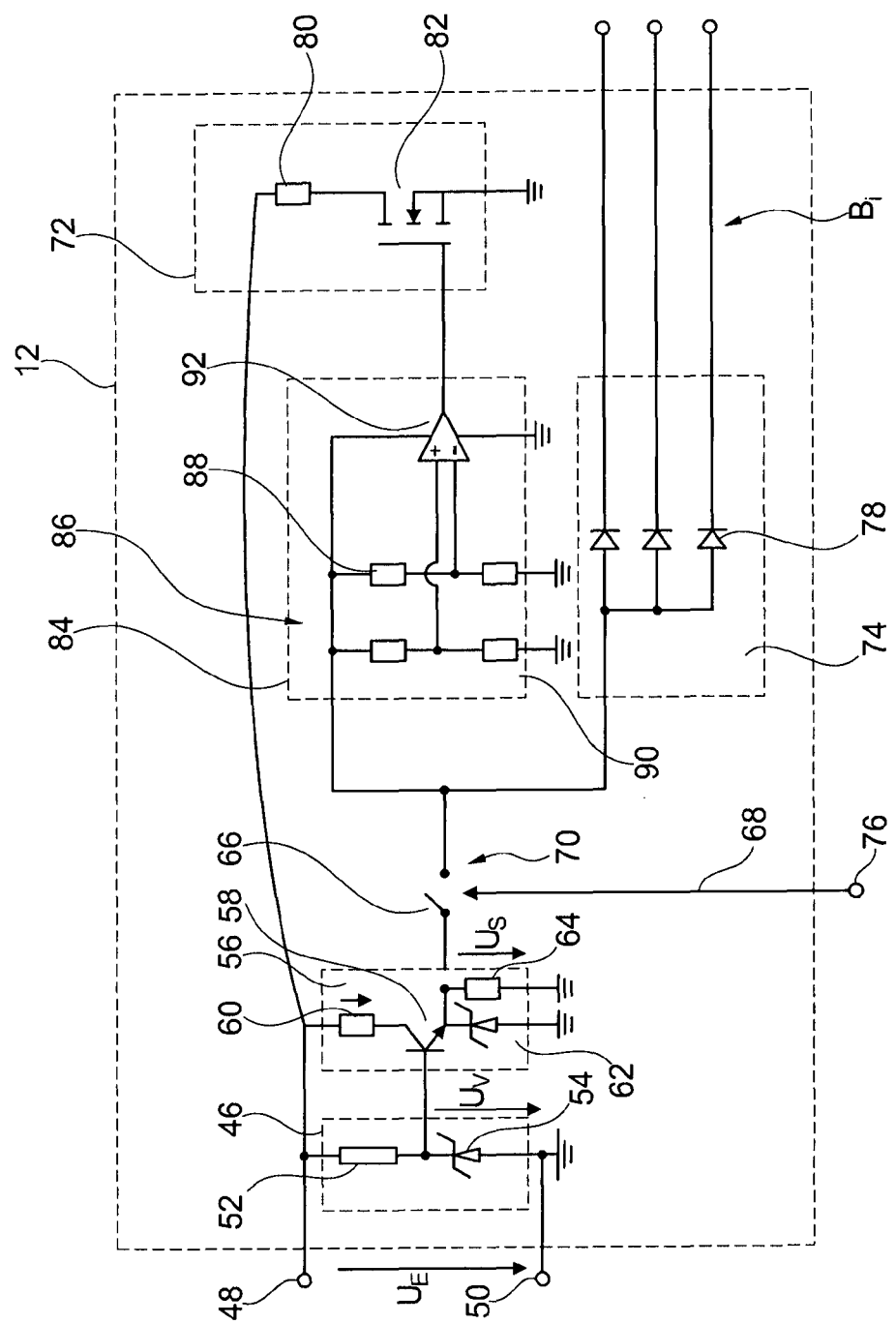
FIG. 2 is a circuit diagram showing the design of the safety circuit according to an embodiment of the invention.

FIG. 2 shows the design of the safety circuit arrangement according to the invention.

The safety circuit arrangement 12 has a supply voltage circuit 46 that is designed to provide supply voltage $U_V$ on the basis of an input voltage $U_E$ that is supplied to it via terminals 48, 50. As shown by the illustration in FIG. 1, the input voltage $U_E$ is the intermediate circuit voltage $U_Z$ that is present across the intermediate circuit capacitance 16, and that again corresponds to the high voltage $U_B$ provided by the traction battery 14. As shown by the illustration in FIG. 2, the supply voltage circuit 46 is implemented as a series circuit comprising an electrical supply resistor 52 and a zener diode 54. The functionality of the supply voltage circuit 46 corresponds to that of a power supply unit. The supply voltage circuit 46 can be used to convert the high voltage $U_B$, which may be in a range from 250 to 450 volts, into a supply voltage $U_V$, which is in the order of magnitude of approximately 15 volts, for example. At any rate, the supply voltage should be of a magnitude such that the switch elements T1, T2, T3, T4, T5, T6, particularly the switch elements T2, T4, T6, can be actuated safely and reliably to produce the short circuit for the phases 20, 22, 24, with voltage losses that arise on interposed components needing to be taken into account in this connection.

The implementation of the supply voltage circuit 46 as a series circuit comprising an electrical resistor and a zener diode has the advantage that such a supply voltage circuit can be used for passively discharging the intermediate circuit capacitance, wherein the value of the resistor determines the period of time that is required before the voltage that is present across the intermediate circuit capacitance has fallen below a voltage value defined by the contact protection limit, or before complete discharge of the intermediate circuit capacitance has occurred.

The supply voltage circuit 46 has a stabilization circuit 56 connected downstream. The stabilization circuit 56 ensures that a sufficiently large current can be provided for the actuation of the switch elements T1, T2, T3, T4, T5, T6 of the inverter 28, particularly the switch elements T2, T4, T6, that is required for shorting the phases 20, 22, 24 of the electric machine 18. As shown by the illustration in FIG. 2, the stabilization circuit 26 consists of a transistor 58, the base of which has the supply voltage $U_V$ applied to it. The collector of the transistor 58 is connected to the input voltage $U_E$ via an electrical resistor 60. The emitter is connected to ground via a parallel circuit formed from a zener diode 62 and an electrical resistor 64.

As shown by the illustration in FIG. 2, the circuitry of the stabilization circuit 56 is arranged between the supply voltage circuit 46 and an activation element 66. The activation element 66 is designed to close an activation path 70 when a switch-on condition is present, as indicated by an arrow 68, in order to activate a discharging circuit 72 and a short circuit control circuit 74 by providing the supply voltage $U_V$. That is to say that when a switch-on condition 68 is present, the activation path 70 is closed and is then used to supply and hence activate the discharging circuit 72 and the short circuit control circuit 74 using the supply voltage $U_V$ provided by the supply voltage circuit 46. In this respect, this path can also be referred to as a supply path. The activation element 66 may be an actuatable semiconductor element or a relay.

As already mentioned above, the supply voltage circuit 46 can be used for passively discharging the intermediate circuit capacitance 16. By contrast, the discharging circuit 72 is used for actively discharging the intermediate circuit capacitance 16.

The text above explains that when a switch-on condition 68 is present, the discharging circuit 72 and the short circuit control circuit 74 are supplied with the supply voltage $U_V$ provided by the supply voltage circuit 46. This is intended to be understood to mean that when the switch-on condition 68 is present, the activation path 70 is closed and hence there is an operative or circuit connection from the discharging circuit 72 and the short circuit control circuit 74 to the supply voltage $U_V$. It goes without saying that for the purpose of activating the two circuits it is not the voltage value of the supply voltage $U_V$ itself but rather the reduced voltage value of the stabilization voltage $U_S$-provided by the stabilization circuit 56 that is available.

Preferably, the electric drive unit 10 is intended to be arranged in a vehicle, which is not shown. Accordingly, the switch-on condition 68 exists when at least one of the following situations is present:
  transfer of the vehicle from a driving operating state to an idle state,
  shutdown of the traction battery, or
  presence of a critical driving operating state that is different than the normal driving operating state.

The evaluation of the aforementioned situations and the provision of a signal representing the switch-on condition are effected in the already described computation unit 42, which outputs this signal via a terminal 76.

The short circuit control circuit 74 is designed, in its activated operating state, to short at least some of the phases 20, 22, 24 of the electric machine 18 by actuating some of the switch elements T1, T2, T3, T4, T5, T6. Preferably, all of the phases 20, 22, 24 are shorted. To this end, the short circuit control circuit 74 contains diodes that can be connected to the actuation connections of the switch elements T2, T4, T6 for the purpose of actuating the latter; in the case of the IGBTs shown in FIG. 1, to the gates thereof. In FIG. 2, one of these diodes is denoted by the reference symbol 78 by way of example.

As already explained, it is sufficient, for the purpose of shorting the phases 20, 22, 24, to switch on the switch elements T2, T4, T6, whereas the switch elements T1, T3, T5 can remain in the off state. This means that actuation signals $B_i$ need to be provided only for the switch elements T2, T4, T6, which is why the short circuit control circuit 74 shown in FIG. 2 has just three diodes 78.

In the case of the safety circuit arrangement 12 according to the invention, there is provision for the short circuit control circuit 74 to actuate the second switch elements 34 connected to the ground terminal 38. In this case, the second switch elements 34 are switched on. Preferably, all three second switch elements 34 are switched on, so that the phases 20, 22, 24 are all shorted to one another. The actuation of the second switch elements that is described here is not intended to have any restricting effect. Similarly, the phases of the electric machine can also be shorted by actuating the first switch elements.

The discharging circuit 72 is designed to take, in its activated operating state, a prescribable discharge current from the intermediate circuit capacitance 16. Hence, in addition to the passive discharge of the intermediate circuit capacitance 16, which is possible or implemented by the supply voltage circuit 46, it is also possible, if required, i.e. when the discharging circuit 72 is activated, to actively discharge the intermediate circuit capacitance 16.

As shown by the illustration in FIG. 2, the discharging circuit 72 is a series circuit consisting of an electrical load resistor 80 and a controllable semiconductor element 82. Preferably, the semiconductor element 82 may be a MOSFET, as shown in FIG. 2. The load resistor 80 and the semiconductor element 82 are in this case dimensioned or designed such that the intermediate circuit capacitance 16 can be discharged in a very short time, specifically at least insofar as the voltage applied thereto is below the contact protection limit of 60 volts. By way of example, the discharging circuit 72 may be set such that this level is achieved within 5 seconds.

As is also shown by the illustration in FIG. 2, the safety circuit arrangement 12 additionally has a monitoring circuit 84 that is designed to process an electrical signal that represents a temperature that is present on the load resistor 80. On the basis of the ascertained monitoring result, the semiconductor element 82 can then be actuated. Hence, overheating of and accordingly potential damage to or even destruction of the load resistor 80 can be prevented by virtue of the discharge current being able to be set on the basis of the load resistor temperature. Preferably, the discharge current is reduced as temperature increases, which can go so far as to reduce the discharge current to zero, i.e. the discharging of the intermediate circuit capacitance 16 is at least intermittently interrupted, when a prescribed temperature threshold value is exceeded.

As shown by the illustration in FIG. 2, the monitoring circuit 84 contains a measuring bridge circuit 86 that is constructed from electrical measuring resistors, one of which is denoted by the reference symbol 88 by way of example. One of the measuring resistors is a temperature-dependent resistor 90 that preferably has a negative temperature coefficient. The temperature-dependent resistor 90 is physically arranged in direct proximity to the load resistor 80. A comparator 92 is used to produce an actuation signal for the semiconductor element 82.

Figure 3:
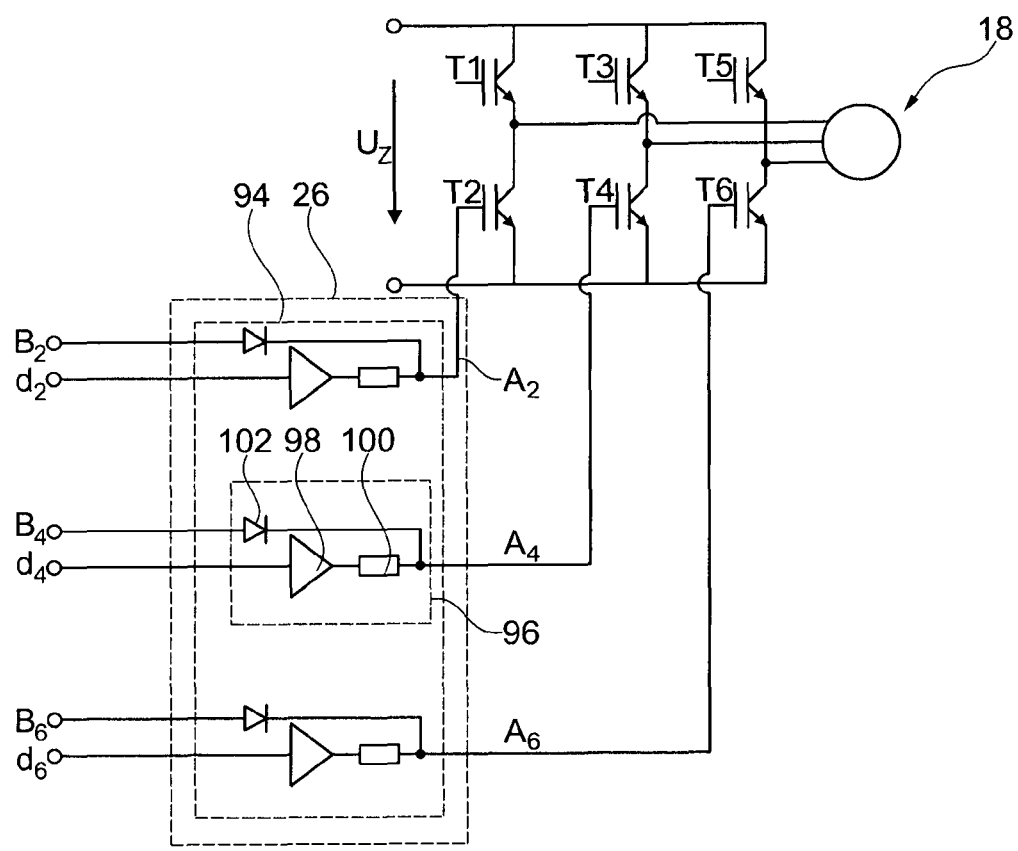
FIG. 3 is a circuit diagram showing an exemplary design of an overlay circuit arrangement that the actuation unit contains.

FIG. 3 uses a circuit diagram to show an exemplary design of an overlay circuit arrangement 94 that the control unit 26 contains. The overlay circuit arrangement 94 has three overlay modules, each of which is associated with a respective one of the switch elements T2, T4, T6 that are intended to be actuated in order to short the phases 20, 22, 24. Of the three overlay modules, one is denoted by the reference numeral 96 by way of example. The embodiments below therefore relate to the overlay module denoted in this manner, but also apply to the other two overlay modules in the same way.

As already explained, the overlay module 96 essentially needs to perform the following two functionalities: firstly, the duty cycle values $d_i$ need to be converted into actuation signals $A_i$. Secondly, the actuation signals $B_i$ are overlaid on the actuation signals $A_i$. The conversion of the duty cycle values di into the actuation signals $A_i$ is effected by means of a series circuit constructed from a driver 98 and a resistor 100. The overlaying is effected by means of a diode 102.

The conversion unit, which is contained in the control unit and associated with the other three switch elements T1, T3, T5, and which contains a respective series circuit, constructed from a driver and a resistor, for each of the three switch elements, is not shown in FIG. 3 for reasons of clarity. Since the phases 20, 22, 24 are intended to be shorted by means of the three switch elements T2, T4, T6, only the conversion functionality is required for the three switch elements T1, T3, T5, the overlay functionality not being required. Accordingly, there are no actuation signals Bi for the switch elements T1, T3, T5.

Since the safety circuit arrangement of the invention has a supply voltage circuit that, on the basis of the intermediate circuit voltage supplied thereto, provides a supply voltage for the discharging circuit and the short circuit control circuit, it is possible to implement active discharge of the intermediate circuit capacitance and active shorting of the terminals or of the phases of the electric machine even if the traction battery and the starter battery simultaneously fail or are not available.

At this juncture, it should be mentioned that the reference to an electric drive unit arranged in a vehicle that is made in the exemplary embodiment described above is not intended to have any limiting effect. The safety arrangement according to the invention can also be used for electric drive units that are used elsewhere.

LIST OF REFERENCE SYMBOLS 10 electric drive unit
12 safety circuit arrangement
14 traction battery
16 intermediate circuit capacitance
18 electric machine
20 phase
22 phase
24 phase
26 control unit
28 inverter
30 half-bridge
32 first switch element
34 second switch element
36 supply terminal 38 ground terminal
40 freewheeling diode
42 computation unit
44 interruption
46 supply voltage circuit
48 terminal
50 terminal
52 electrical supply resistor
54 zener diode
56 stabilization circuit
58 transistor
60 electrical resistor
62 zener diode
64 electrical resistor
66 activation element
68 arrow
70 activation path
72 discharging circuit
74 short circuit control circuit
76 terminal
78 diode
80 electrical load resistor
82 controllable semiconductor element
84 monitoring circuit
86 measuring bridge circuit
88 measuring resistor
90 temperature-dependent resistor
92 comparator
94 overlay circuit arrangement
96 overlay module
98 driver
100 resistor
102 diode The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A safety circuit arrangement for an electric drive unit equipped with a traction battery, an intermediate circuit capacitance connected in parallel with the traction battery and an electric machine that is supplied with electric power via the traction battery, wherein the electric machine has a plurality of phases connectable to the traction battery via a controllable inverter having a plurality of switch elements, the safety circuit arrangement comprising:
   a discharging circuit configured, in an activated operating state, to take a prescribable discharge current from the intermediate circuit capacitance;
   a short circuit control circuit, including a plurality of diodes, configured, in the activated operating state, to short at least some of the plurality of phases of the electric machine by actuating some of the plurality of switch elements;
   a supply voltage circuit configured to provide a supply voltage based on an input voltage supplied to the supply voltage circuit, wherein the input voltage supplied is an intermediate circuit voltage that is applied to the intermediate circuit capacitance; and implemented as a series circuit comprising at least an electrical supply resistor and a diode,
   an activation element configured to close an activation path when a switch-on condition is present in order to activate the discharging circuit and the short circuit control circuit by providing the supply voltage; and
   a stabilization circuit consisting of a transistor, connected to the input voltage via at least an electrical resistor and arranged between the supply voltage circuit and the activation element;
   wherein the supply voltage is output from the supply voltage circuit to an input of the stabilization circuit, and a stabilization voltage is output from the stabilization circuit to an input of the activation element.

2. The safety circuit arrangement according to claim 1 in which the electric drive unit is arranged in a vehicle, wherein the switch-on condition is present when at least one of the following situation occurs: a transfer of the vehicle from a driving operating state to an idle state, a shutdown of the traction battery, or a presence of a critical driving operating state that is different from a normal driving operating state.

3. The safety circuit arrangement according to claim 1, wherein the supply voltage circuit comprises a series circuit of an electrical supply resistor and a Zener diode.

4. The safety circuit arrangement according to claim 3, wherein the discharging circuit comprises a series circuit of an electrical load resistor and a controllable semiconductor element.

5. The safety circuit arrangement according to claim 4, further comprising: a monitoring circuit configured to process an electrical signal representing a temperature present on the electrical load resistor of the discharging circuit.

6. The safety circuit arrangement according to claim 5, wherein the monitoring circuit is configured to actuate the controllable semiconductor element of the discharging circuit based on a determined monitoring result.

7. The safety circuit arrangement according to claim 6, wherein the monitoring circuit comprises a measuring bridge circuit constructed from electrical measuring resistors, wherein one of the electrical measuring resistors is a temperature-dependent resistor.

8. The safety circuit arrangement according to claim 7, wherein the temperature-dependent resistor has a negative temperature coefficient.

9. The safety circuit arrangement according to claim 1, wherein the discharging circuit comprises a series circuit of an electrical load resistor and a controllable semiconductor element.

10. The safety circuit arrangement according to claim 9, further comprising: a monitoring circuit configured to process an electrical signal representing a temperature present on the electrical load resistor of the discharging circuit.

11. The safety circuit arrangement according to claim 10, wherein the monitoring circuit is configured to actuate the controllable semiconductor element of the discharging circuit based on a determined monitoring result.

12. The safety circuit arrangement according to claim 10, wherein the monitoring circuit comprises a measuring bridge circuit constructed from electrical measuring resistors, wherein one of the electrical measuring resistors is a temperature-dependent resistor.

13. The safety circuit arrangement according to claim 12, wherein the temperature-dependent resistor has a negative temperature coefficient.

14. The safety circuit arrangement according to claim 1, wherein the controllable inverter has a plurality of half-bridge circuits, each half-bridge circuit comprising first and second switch elements, wherein the first switch element is connected to a supply terminal of the traction battery, the second switch element is connected to a ground terminal of the traction battery, and the short circuit control circuit is configured to actuate the second switch elements connected to the ground terminal.

15. The safety circuit arrangement according to claim 1, wherein the controllable inverter has a plurality of half-bridge circuits, each half-bridge circuit comprising first and second switch elements, wherein the first switch element is connected to a supply terminal of the traction battery, the second switch element is connected to a ground terminal of the traction battery, and the short circuit control circuit is configured to actuate the second switch elements connected to the ground terminal.

16. A vehicle, comprising:
an electric drive unit, the electric drive unit comprising a traction battery, an intermediate circuit capacitance connected in parallel with the traction battery, and an electric machine that is supplied with electric power via the traction battery, the electric machine having a plurality of phases connectable to the traction battery via a controllable inverter having a plurality of switch elements;
a safety circuit arrangement for the electric drive unit, the safety circuit arrangement comprising:
a discharging circuit configured, in an activated operating state, to take a prescribable discharge current from the intermediate circuit capacitance;
a short circuit control circuit, including a plurality of diodes, configured, in the activated operating state, to short at least some of the plurality of phases of the electric machine by actuating some of the plurality of switch elements;
a supply voltage circuit configured to provide a supply voltage based on an input voltage supplied to the supply voltage circuit, wherein the input voltage supplied is an intermediate circuit voltage that is applied to the intermediate circuit capacitance; and implemented as a series circuit comprising at least an electrical supply resistor and a diode,
an activation element configured to close an activation path when a switch-on condition is present in order to activate the discharging circuit and the short circuit control circuit by providing the supply voltage; and
a stabilization circuit consisting of a transistor, connected to the input voltage via at least an electrical resistor and arranged between the supply voltage circuit and the activation element;
wherein the supply voltage is output from the supply voltage circuit to an input of the stabilization circuit, and a stabilization voltage is output from the stabilization circuit to an input of the activation element.

17. The vehicle according to claim 16, wherein: the switch-on condition is present when at least one of the following situation occurs: a transfer of the vehicle from a driving operating state to an idle state, a shutdown of the traction battery, or a presence of a critical driving operating state that is different from a normal driving operating state.

18. The vehicle according to claim 17, wherein the controllable inverter has a plurality of half-bridge circuits, each half-bridge circuit comprising first and second switch elements, wherein the first switch element is connected to a supply terminal of the traction battery, the second switch element is connected to a ground terminal of the traction battery, and the short circuit control circuit is configured to actuate the second switch elements connected to the ground terminal.

* * * * *